US012012020B2

(12) United States Patent
Jaradi et al.

(10) Patent No.: US 12,012,020 B2
(45) Date of Patent: Jun. 18, 2024

(54) CHILD SEAT ANCHOR INCLUDING ENERGY ABSORBER

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 17/812,465

(22) Filed: Jul. 14, 2022

(65) Prior Publication Data

US 2024/0017649 A1 Jan. 18, 2024

(51) Int. Cl.
*B60N 2/28* (2006.01)

(52) U.S. Cl.
CPC ......... *B60N 2/2809* (2013.01); *B60N 2/2884* (2013.01); *B60N 2/2893* (2013.01); *B60N 2/28* (2013.01); *B60N 2/2821* (2013.01); *B60N 2/2842* (2013.01)

(58) Field of Classification Search
None
See application file for complete search history.

(56) References Cited

U.S. PATENT DOCUMENTS 5,611,498 A * 3/1997 Miller, III ........... B60R 22/3413
242/379.1
10,442,396 B2 10/2019 Faruque et al.
2003/0173817 A1 * 9/2003 Vits ......................... B60R 22/12
297/484
2004/0051356 A1 * 3/2004 Neelis .................... B60N 2/289
297/253
2005/0225138 A1 * 10/2005 Laporte ................ B60N 2/2809
297/254
2011/0193394 A1 * 8/2011 Stiyer ................... B60N 2/2809
297/463.1

(Continued)

FOREIGN PATENT DOCUMENTS

CA 3016034 A1 * 3/2019 ........... B60N 2/2809
EP 1262383 A2 * 12/2002 ........... B60N 2/2809

(Continued)

OTHER PUBLICATIONS

Lamberson et al., "Dynamic Behavior of Materials, Volume 1", Proceedings of the 2020 Annual Conference on Experimental and Applied Mechanics.

*Primary Examiner* — David E Allred
(74) *Attorney, Agent, or Firm* — Frank A. MacKenzie; Bejin Bieneman PLC

(57) ABSTRACT

A vehicle seat includes a seatback and a child seat tether anchor supported by the seatback. The child seat tether anchor has a first member fixed to the seatback and a second member rotatably supported by the seatback. One of the first member and the second member defines a cavity with internal threads and the other of the first and second member is received in the cavity and has external threads engaged with the internal threads. A strap is on the second member. An energy absorber is in the cavity. The energy absorber is compressible relative to the first member and the second member.

17 Claims, 9 Drawing Sheets

(56) References Cited

U.S. PATENT DOCUMENTS

| | | | | |
|---|---|---|---|---|
| 2016/0152164 A1* | 6/2016 | Hass | ..................... | B60N 2/2866 |
| | | | | 297/216.11 |
| 2017/0197527 A1* | 7/2017 | Simonin | .............. | B60N 2/2884 |
| 2018/0297496 A1* | 10/2018 | Pline | ........................ | B60N 2/64 |
| 2021/0070244 A1* | 3/2021 | Guo | ....................... | B60N 2/2809 |
| 2022/0212579 A1* | 7/2022 | Tate | ......................... | B60N 2/64 |

FOREIGN PATENT DOCUMENTS

| | | | | | |
|---|---|---|---|---|---|
| EP | 3288802 | B1 | | 2/2020 | |
| JP | 2003048467 | A | * | 2/2003 | ........... B60N 2/2809 |
| JP | 2009274492 | A | | 11/2009 | |
| WO | 2010043347 | A1 | | 4/2010 | |

* cited by examiner

CHILD SEAT ANCHOR INCLUDING ENERGY ABSORBER

BACKGROUND

Child seats are removable seats for seating and restraining children riding in a vehicle. Types of child seats include rearward-facing child seats, forward-facing child seats, combination seats that can face rearward or forward, and booster seats. Rearward-facing, forward-facing, and combination child seats include a harness for restraining the child occupant. Booster seats rely on the seatbelts included with the vehicle. Child seats may be held in place by the seatbelt of the vehicle and/or may include tethers for attaching to tether attachment brackets of the vehicle.

Vehicles are equipped with anchor for anchoring the child seat to the vehicle. Specifically, the anchor may provide for anchoring of the child seat to a vehicle seat and/or to a body of the vehicle. Child seats include anchoring for connecting the anchor of the vehicle. The anchor of the vehicle and the anchoring system of the child seat may be configured to comply with a standard, e.g., ISOFIX (e.g., ISO216), which is an international standard for attachment points for child safety seats in passenger cars; LATCH ("Lower Anchors and Tethers for Children") in the United States; LUAS ("Lower Universal Anchorage System"); Canfix in Canada; UCSSS ("Universal Child Safety Seat System").

DETAILED DESCRIPTION

Figure 1:
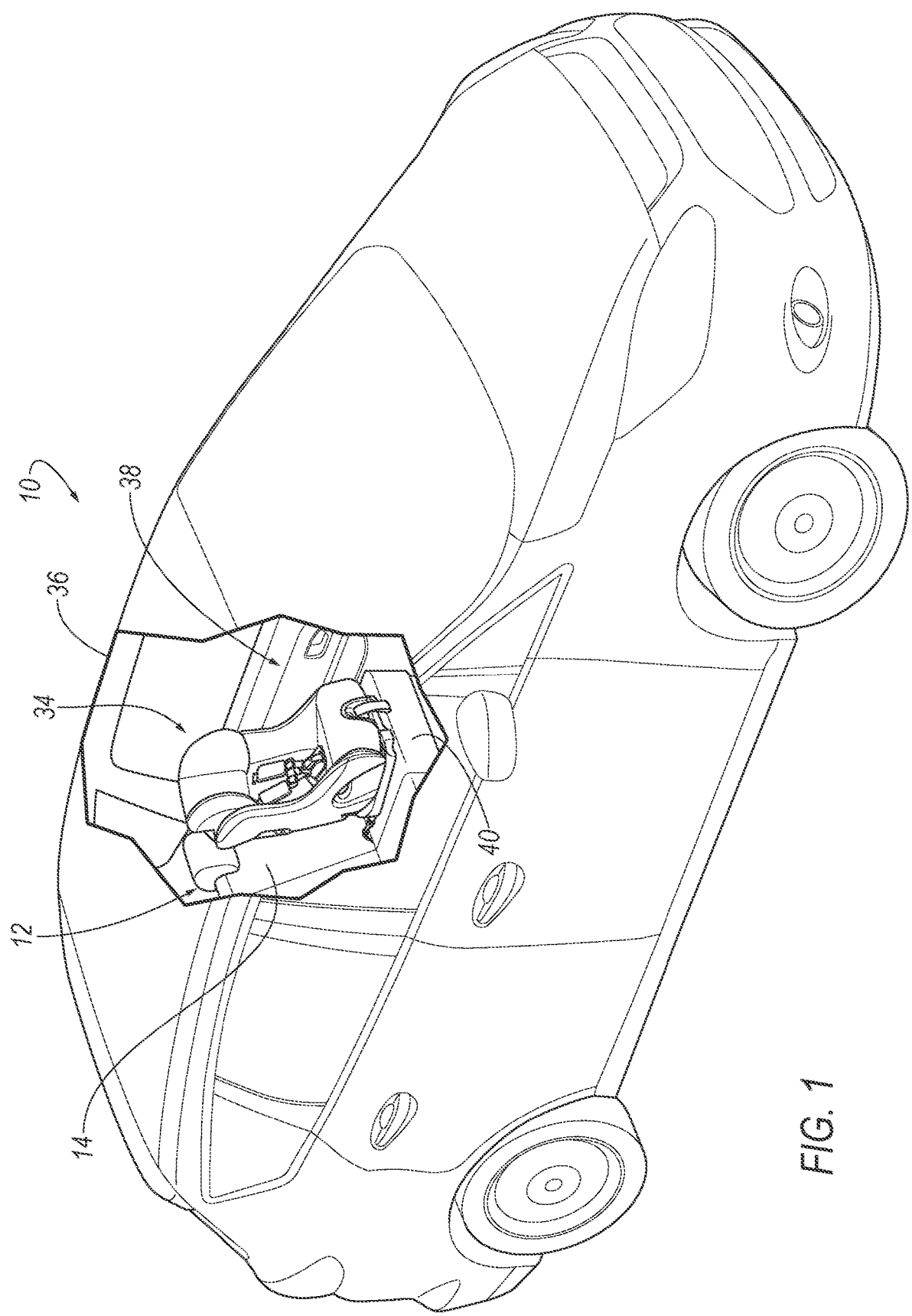
FIG. 1 is a perspective view of a vehicle with a cut-away to show a child seat on a vehicle seat.
Figure 2:
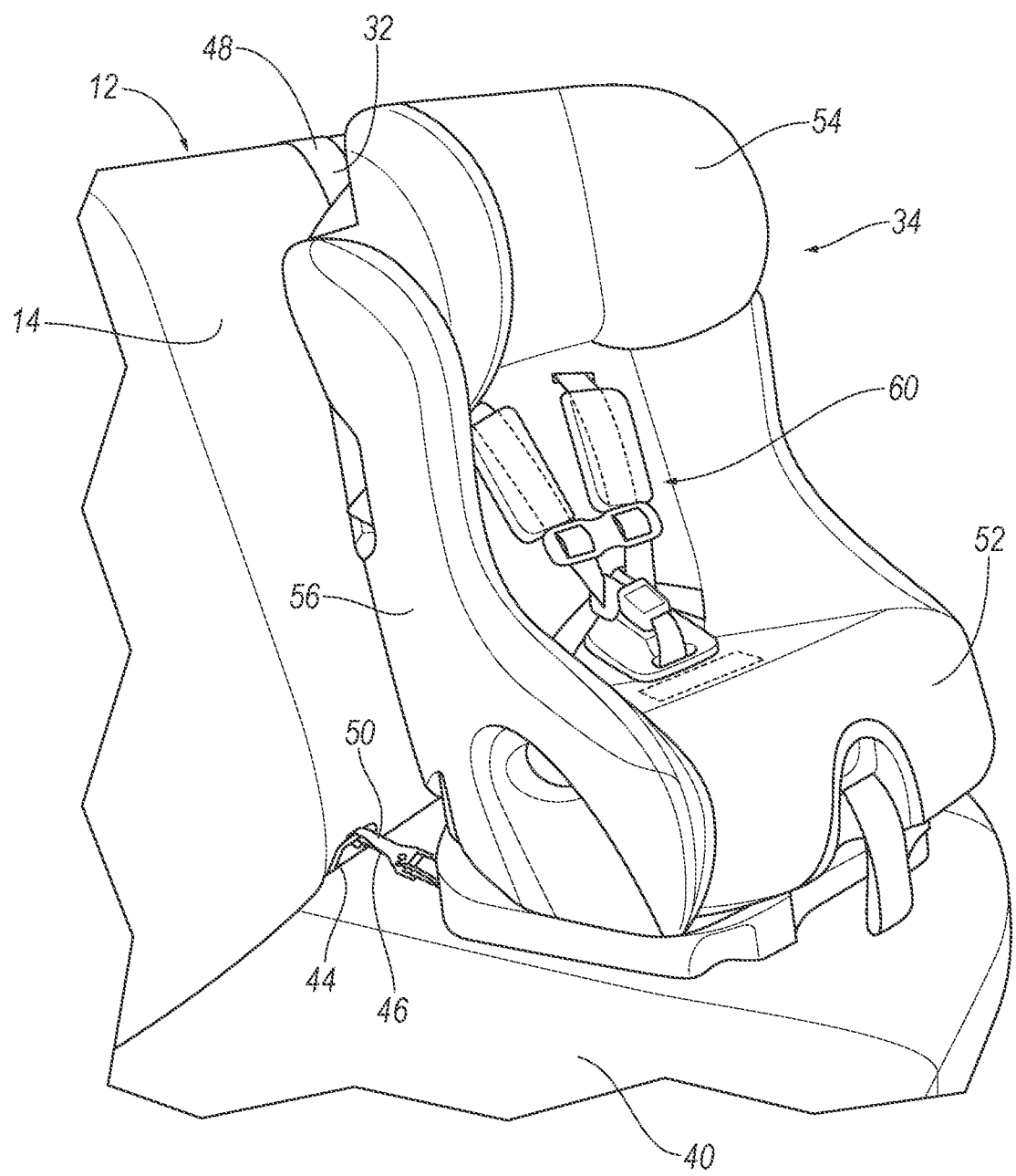
FIG. 2 is a magnified view of the child seat on the vehicle seat.
Figure 3:
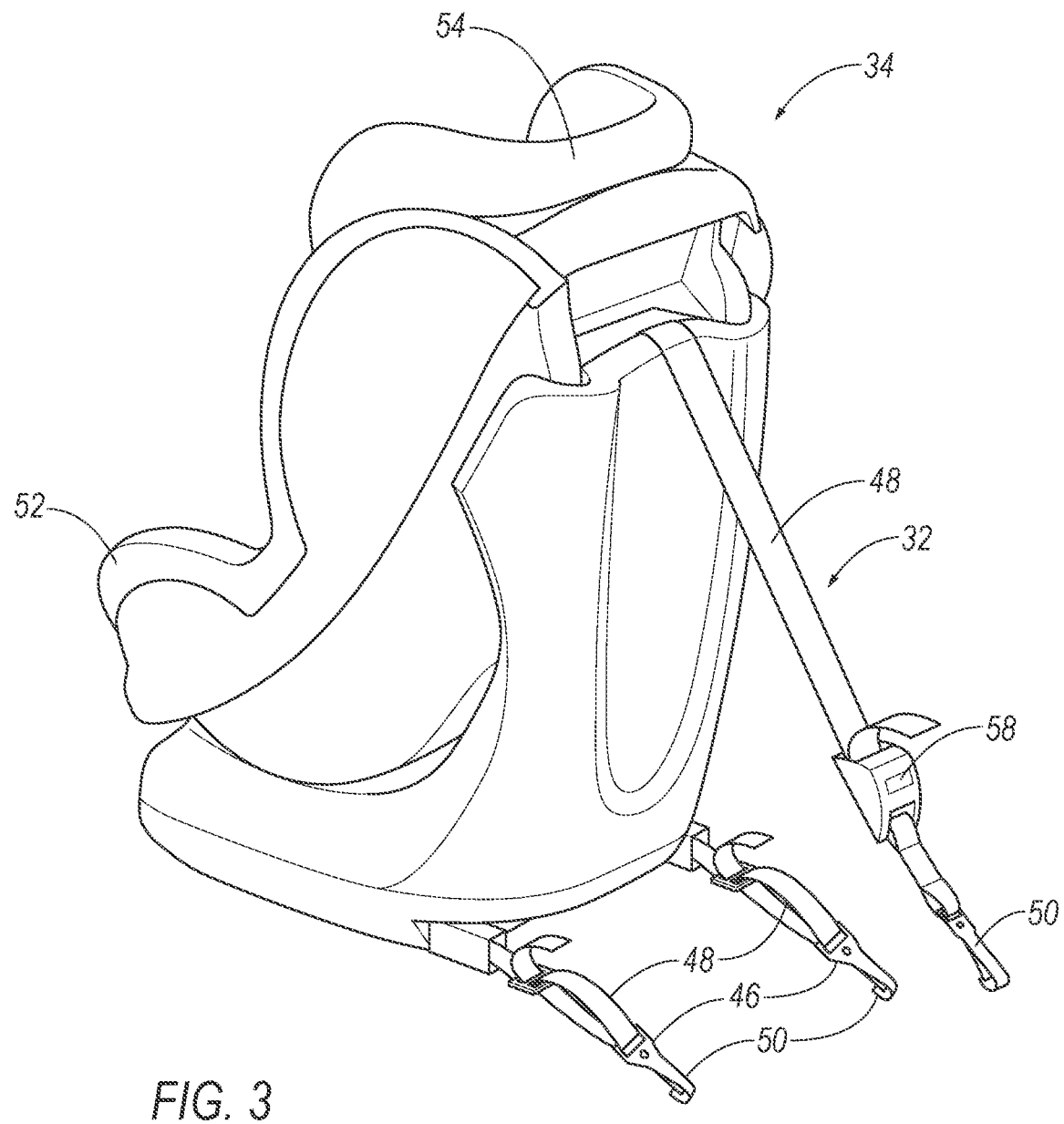
FIG. 3 is a rear view of the child seat.
Figure 4:
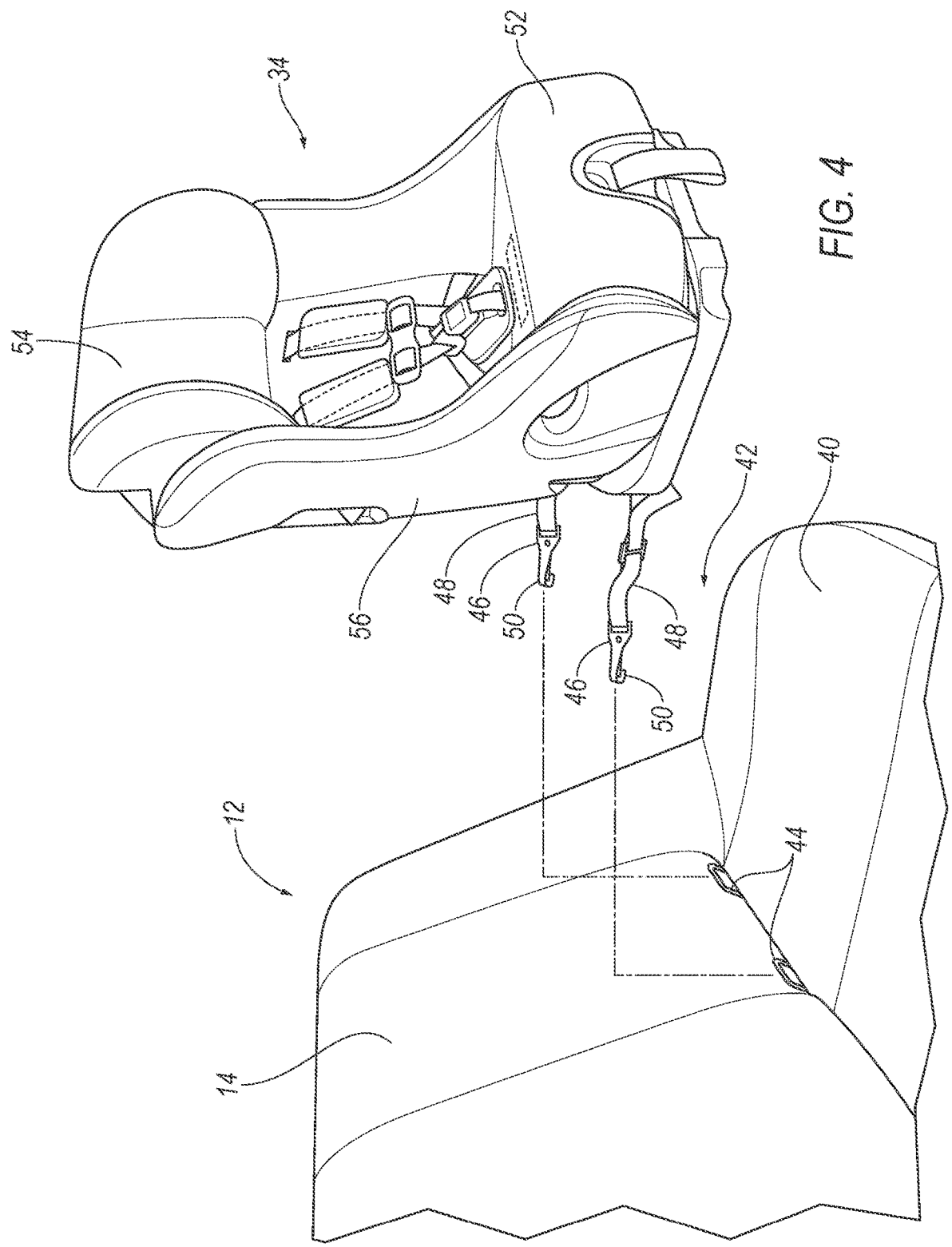
FIG. 4 is a perspective view of the child seat removed from the vehicle seat.

A vehicle seat includes a seatback and a child seat tether anchor supported by the seatback. The child seat tether anchor has a first member fixed to the seatback and a second member rotatably supported by the seatback. One of the first member and the second member defines a cavity with internal threads and the other of the first and second member is received in the cavity and has external threads engaged with the internal threads. The vehicle seat includes a strap on the second member. An energy absorber is in the cavity. The energy absorber is compressible relative to the first member and the second member.

The strap may be wound around the second member.

The vehicle seat may includes a connecting ring fixed to the strap. The strap may include a proximal end fixed to the second member and a distal end spaced from the proximal end. The connecting ring may be fixed to the distal end.

The vehicle seat may include a connecting ring fixed to the strap. The strap may include a proximal end fixed to the second member and a distal end spaced from the proximal end. The connecting ring may be fixed to the distal end.

The child seat tether anchor may include a frame fixed to the seatback. The first member may be fixed to the frame and the second member may be rotatably supported by the frame. The frame may include a hole that rotatably receives the second member.

The second member may have a first end and a second end spaced from each other along a rotational axis. The threads may be on the first end and the second end engage the hole.

The energy absorber may be a compressible fluid sealed in the cavity between the first member and the second member.

The energy absorber may be a compressible liquid sealed in the cavity between the first member and the second member.

The energy absorber may include a liquid and hydrophobic nanoporous particles in the liquid.

An assembly includes a seat having a seatback and a child seat anchored to the seat and having a tether. An anchor is supported by the seatback. The anchor has a first member fixed to the seatback and a second member rotatably supported by the seatback. One of the first member and the second member defines a cavity with internal threads and the other of the first and second member is received in the cavity and has external threads engaged with the internal threads. A strap is on the second member. The tether of the child seat is connected to the strap. An energy absorber is in the cavity. The energy absorber is compressible relative to the first member and the second member.

The strap may be wound around the second member.

The vehicle seat may include a ring fixed to the strap. The strap may include a proximal end fixed to the second member and a distal end spaced from the proximal end. The ring may be fixed to the distal end. The tether may be connected to the ring.

The vehicle seat may include a ring fixed to the strap. The strap includes a proximal end fixed to the second member and a distal end spaced from the proximal end. The ring may be fixed to the distal end. The tether may be connected to the ring.

The energy absorber may be a compressible fluid sealed in the cavity between the first member and the second member.

The energy absorber may be a compressible liquid sealed in the cavity between the first member and the second member.

The energy absorber may include a liquid and hydrophobic nanoporous particles in the liquid.

The second member may be rotatable relative to the first member between a loaded position that loads the energy absorber and an unloaded position that unloads the energy absorber relative to the loaded position. The energy absorber may resiliently deform between the loaded and unloaded positions.

With reference to the Figures, wherein like numerals indicate like parts throughout the several views, a vehicle seat 12 includes a seatback 14 and a child seat 34 tether anchor (hereinafter referred to as "upper anchor 16") supported by the seatback 14. The upper anchor 16 has a first member 18 fixed to the seatback 14 and a second member 26 rotatably supported by the seatback 14. One of the first member 18 and the second member 26 defines a cavity 22 with internal threads 24 and the other of the first and second member 26 is received in the cavity 22 and has external threads 26 engaged with the internal threads 24. A strap 28 is on the second member 26. An energy absorber 30 is in the cavity 22. The energy absorber 30 is compressible relative to the first member 18 and the second member 26.

An upper tether 32 of a child seat 34 is connectable to the strap 28 of the upper anchor 16, as described further below. During a vehicle impact that urges the child seat 34 vehicle-forward, the tether pulls the strap 28 to rotate the second member 26 relative to the first member 18. Specifically, the engagement of the internal threads 24 and external threads 26 translates the second member 26 relative to the first member 18. This relative rotation allows for payout of the strap 28 from the second member 26 and a limited amount of forward movement of the child seat 34. The relative translation compresses the energy absorber 30 so that the energy absorber 30 absorbs energy to slow and limit the movement of the child seat 34. In other words, the upper anchor 16 acts as a load limiter. The rotational engagement of the first member 18 and the second member 26 reduces the footprint of the upper anchor 16 to reduce packaging constraints.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a vehicle body 36 that may be of a unibody construction, a body-on-frame construction (also referred to as a cab-on-frame construction), or any other suitable construction. The vehicle body 36 may be of any suitable material, for example, steel, aluminum, and/or fiber-reinforced plastic, etc.

The vehicle body 36 may define a passenger cabin 38 to house occupants, if any, of the vehicle 10. The passenger cabin 38 may extend across the vehicle 10, i.e., from one side to the other side of the vehicle 10. The passenger cabin 38 includes a front end and a rear end with the front end being in front of the rear end during forward movement of the vehicle 10.

The vehicle 10 includes one or more vehicle seats 12 in the passenger cabin 38. The vehicle 10 may include any suitable number of vehicle seats 12. The vehicle seats 12 may be arranged in the passenger cabin 38 in any suitable position, i.e., as front seats, rear seats, third-row seats, etc. The vehicle seat 12 may be movable relative to the floor to various positions, e.g., movable fore-and-aft and/or cross-vehicle. The vehicle seats 12 may be of any suitable type, e.g., a bucket seat. Any suitable number of the vehicle seats 12, i.e., one or more, may include the upper anchor 16.

The vehicle seat 12 includes the seatback 14 and a seat bottom 40. The seatback 14 may be supported by the seat bottom 40 and may be stationary or movable relative to the seat bottom 40. The seatback 14 and the seat bottom 40 may be adjustable in multiple degrees of freedom. Specifically, the seatback 14 and the seat bottom 40 may themselves be adjustable, in other words, adjustable components within the seatback 14 and/or the seat bottom 40, and/or may be adjustable relative to each other.

The vehicle seat 12, specifically the seatback 14 and the seat bottom 40, includes a seat frame and a covering supported on the seat frame. The seat frame may include tubes, beams, etc. The seat frame may be of any suitable metal (e.g., steel, aluminum, etc.), of any suitable plastic material (e.g., carbon fiber reinforced plastic (CFRP), glass fiber-reinforced semi-finished thermoplastic composite (organosheet), etc.), or any other suitable material.

The covering may include upholstery and padding. The upholstery may be cloth, leather, faux leather, or any other suitable material. The upholstery may be stitched in panels around the frame. The padding may be between the covering and the seat frame and may be foam or any other suitable material.

The vehicle seat 12 defines an occupant-seating area 42. The child seat 34 may be disposed in the occupant-seating area 42 when installed, as shown in the Figures. The occupant-seating area 42 of the vehicle seat 12 may be above the seat bottom 40 and on a front side of the seatback 14.

The vehicle seat 12 includes at least one anchor 16, 44. Each anchor 16, 44 is fixed to a component of vehicle seat 12. For example, the anchor 16, 44 may be fixed to the seat frame, and more specifically, to the seat frame of the seatback 14. The anchor 16, 44 transmits force from the child seat 34 to the vehicle seat 12 to control the position of the child seat 34 on the vehicle seat 12 when the child seat 34 is engaged with the anchor 16, 44, as described further below. As another example, the anchor 16, 44 may be fixed to the vehicle body 36, e.g., a pillar, floor, etc. The anchor 16, 44 is designed to engage a clip 50 of the child seat 34, as described further below.

The vehicle seat 12 may include more anchor. As one example, the vehicle seat 12 may include the upper anchor 16 on the seatback 14, as described further below. In the example shown in the Figures, the vehicle seat 12 may also include two other anchors (in this example referred to as "lower anchors 44") at the intersection of the seat bottom 40 and the seatback 14. The lower anchors 44 may be between the seat bottom 40 and seatback 14, e.g., such that the lower anchors 44 may be accessed by compressing the covering of the seatback 14 and/or seat bottom 40. The upper anchor 16 may be accessible on the vehicle-rearward side of the seatback 14.

The anchors 16, 44 may be configured to comply with a standard. As an example, the anchors 16, 44 may be configured to comply with ISOFIX (e.g., ISO216), which is an international standard for attachment points for child safety seats in passenger cars. In addition or as other examples, the child seat 34 may be configured to comply with LATCH ("Lower anchors and Tethers for Children") in the United States, LUAS ("Lower Universal Anchorage System") or Canfix in Canada, and/or UCSSS ("Universal Child Safety Seat System"). Specifically, the anchors 16, 44 may be positioned, sized, designed, etc., to comply with the standard.

The child seat 34 is anchored to the vehicle seat 12 with the anchors 16, 44, as described further below. The child seat 34 is designed to control kinematics of a child, e.g., a human having a certain, age, height, weight, etc., during a vehicle 10 collision. The child seat 34 is configured for installation in the vehicle 10. When installed in the vehicle 10, the child seat 34 is supported by the vehicle seat 12. For example, the child seat 34 may sit atop the seat bottom 40 and abut the seatback 14. The child seat 34 may be installed in a rearward-facing orientation, i.e., where the occupant of the child seat 34 faces a rear of the vehicle 10, as shown in the example in the Figures. In other examples, the child seat 34 may be installed in a forward-facing orientation, i.e., where the occupant of the child seat 34 faces a front of the vehicle 10.

The child seat 34 is designed to receive a child. The child seat 34 may include a seating portion having a bottom 52 and a back 54, e.g., for a child to sit on and recline against. The child seat 34 may include a base 56 supporting the seating portion. The base 56 may be below the bottom 52 and/or behind the back 54. The bottom 52 and/or back 54 may pivot relative to the base 56, e.g., to change an angle of the bottom 52 and/or back 54 of the child seat 34 relative to the vehicle seat 12 supporting the child seat 34. The bottom 52 and/or the back 54 may be upholstered, padded, etc. The base 56 may be rigid relative to the bottom 52 and/or the back 54. For example, the base 56 may be of rigid material including material types such as plastic, metal, etc.

The child seat 34 may be configured to comply with a standard. As an example, the child seat 34 may be configured to comply with ISOFIX (e.g., ISO216), which is an international standard for attachment points for child safety seats in passenger cars. In addition or as other examples, the child seat 34 may be configured to comply with LATCH ("Lower anchors and Tethers for Children") in the United States, LUAS ("Lower Universal Anchorage System") or Canfix in Canada, and/or UCSSS ("Universal Child Safety Seat System").

The child seat 34 includes at least one tether 32, 46. The child seat 34 may include one tether 32, 46 for each anchor 16, 44 of the vehicle seat 12 on which the child seat 34 is supported. For example, in the example shown in the Figures, the child seat 34 includes two lower tethers 46 and one upper tether 32. The tethers 32, 46 may be connected directly the base 56, the bottom 52, and/or the back 54. Engagement of the tethers 32, 46 with the anchors 16, 44 provide physical attachment of the child seat 34 to the vehicle seat 12. In addition to or in the alternative to some of the tethers 32, 46, e.g., the lower tethers 46, the child seat 34 may be engageable with the seatbelt of the vehicle seat 12 to anchor the child seat 34 to the vehicle seat 12, as is known.

One or more of the tethers 32, 46 of the child seat 34 may include webbing 48 and a clip 50 engaged with the webbing 48. In such an example the webbing 48 is fixed directly to the base 56, the bottom 52, and/or the back 54 and the clips 50 are releasably engageable with the anchors 16, 44 of the vehicle seat 12. The clips 50, may include an open loop and flexible gate, may be "alligator" style defining a slot with a button actuated latch, or any other suitable configuration for connecting the respective anchor. The clips 50 may be configured for attachment to the anchor 16, 44 that meets a standard, e.g., ISOFIX, LATCH, LUAS, UCSSS, etc.

The webbing 48 may extend through openings of the base 56, the bottom 52, and/or the back 54. The webbing 48 may be looped around components of the base 56, the bottom 52, and/or the back 54 and sewn to itself. The clips 50 may be fixed to a distal end 78 of the webbing 48. For example, a loop may be sewn at the distal end 78 and extend through an opening of the clips 50. As another example, the clip 50 may be slideably secured to the webbing 48.

The tether 32, 46 may include an adjustment mechanism 58 for adjusting the length of the tether 32, 46 for attachment and tightening of the tether 32, 46 to the anchor 16, 44. For example, the upper tether 32 in the example shown in the Figures includes the adjustment mechanism 58. The adjustment mechanism 58 may include any suitable structure to adjust the length of the tether 32, 46 such as bars, rollers, etc., including known structure.

The child seat 34 includes a harness 60 that controls kinematics of a child in the child seat 34, e.g., when the child seat 34 is installed in the vehicle 10 and during an impact to the vehicle 10. The harness 60 may include multiple portions of webbing 48 that are releasably securable to each other, e.g., via a buckle and latch plates including those that are known. The harness 60 may be designed to extends across shoulders and a chest of the child in the child seat 34. The harness 60 may be designed to extends across hips of the child in the child seat 34. The harness 60 may be designed to extend between legs of the child in the child seat 34, e.g., to prevent "submarining" of the child during an impact to the vehicle 10.

The harness 60 is connected to the base 56, the bottom 52, and/or the back 54. For example, the harness 60 may extend around and/or through slots in the base 56, the bottom 52, and/or the back 54. The harness 60 may include a selectively engageable clamp that enables adjustment of a length of one or more portions of the harness, e.g., to adjust a size of the harness to accommodate a size of the child in the child seat 34.

The buckle of the child seat 34 assembly selectively secures portions of the webbing 48 relative to each other. For example, the buckle may define a slot designed to receive one or more latch plates, supposed by the portions. The buckle may engage the latch plates, upon their insertion into the slot and restrict removal therefrom. The buckle may include a button that, upon depression, disengages the buckle from the latch plates, and permits removal of the latch plates, from the slot(s) of the buckle. The latch plates are designed to be received by and selectively engageable with the buckle. For example, the latch plates may include an opening or other feature designed to engage with a latch of the buckle. The latch plates are supported by the harness.

As set forth above, the upper anchor 16 is on the seatback 14 for releasable connection with the upper tether 32 of the child seat 34. The upper anchor 16 has the first member 18, the second member 26, and the strap 28. In some examples, such as the example shown in the Figures, the upper anchor 16 includes a frame 62 fixed to the seatback 14 and supporting the first member 18 and the second member 26. As described further below, the energy absorber 30 is between the first member 18 and the second member 26 and absorbs energy during rotation of the second member 26 relative to the first member 18. For example, during a vehicle impact that urges the child seat 34 vehicle-forward, the upper tether 32 pulls the strap 28, which rotates the second member 26 relative to the first member 18 and translates the second member 26 relative to the first member 18. This relative rotation allows for payout of the strap 28 from the second member 26 and a limited amount of forward movement of the child seat 34. The relative translation compresses the energy absorber 30 so that the energy absorber 30 absorbs energy to slow and limit the movement of the child seat 34. In other words, the upper anchor 16 acts as a load limiter. This may reduce compression of the harness 60 on the occupant of the child seat 34. When the energy absorber 30 is fully compressed, as described further below, the energy absorber 30 prevents further rotation of the second member 26 relative to the first member 18 to prevent further relative rotation of the first member 18 and the second member 26. The upper anchor 16 may be resettable. In such an example, the energy absorber 30 is resilient and, when force on the strap 28 from the upper tether 32 is released, the energy absorber 30 decompresses to rotate and extend the second member 26 from the cavity 22 to retract the strap 28 onto the second member 26.

The first member 18 is fixed to the seatback 14. In other words, during operation of the vehicle 10 with the upper tether 32 engaged with the upper anchor 16, the first member 18 does not move, specifically does not rotate, relative to the seatback 14. The first member 18 may be indirectly fixed to the seatback 14. As an example, the first member 18 may be fixed to the frame 62 and the frame 62 may be fixed to the seatback 14. As another example, the first member 18 may be directly fixed to the seatback 14. The first member 18 may be fixed to, for example the frame of the seatback 14.

The second member 26 is rotatably supported by the seatback 14. In other words, the second member 26 is freely rotatable relative to the seatback 14. Specifically, the second member 26 has a first end 68 and a second end 70 spaced from each other along a rotational axis. The first end 68 is engaged with the first member 18, as described below, and the second member 26 is rotatable relative to the seatback 14. The second member 26 may be indirectly connected to the seatback 14. As an example the second end 70 may be connected to the frame 62 and the frame 62 may be fixed to the seatback 14. In such an example, the second end 70 and the frame 62 engage each other such that the second end 70 is freely rotatable relative to the first end 68 when the strap 28 exerts sufficient force to rotate and translate the first end 68 into the cavity 22 against the resistance of the energy absorber 30.

As set forth above, one of the first member 18 and the second member 26 defines a cavity 22 and the other of the first member 18 and the second member 26 is received in the cavity 22. The energy absorber 30 is in the cavity 22, as described further below. In the example shown in the Figures, the first member 18 defines the cavity 22 and the second member 26, specifically the first end 68 of the second member 26, is received in the cavity 22.

The cavity 22 is designed, i.e., sized and shaped, to moveably receive the other of the first member 18 and the second member 26, i.e., the second member 26 in the example shown in the Figures. With reference to the example shown in the Figures, the cavity 22 is sized so that the first end 68 of the second member 26 moves into and out of the cavity 22 as the strap 28 is paid from and retracted onto the second member 26.

The first member 18 and the second member 26 are designed to transmit rotation as applied by the strap 28 on the second member 26 into translation of the second member 26 relative to the first member 18. For example, the cavity 22 includes internal threads 24 and the other of the first and second member 26 being received in the cavity 22 and has external threads 26 engaged with the internal threads 24. Specifically, in the example shown in the Figures, the cavity 22 includes internal threads 24 and the second end 70 of the second member 26 is received in the cavity 22 and has external threads 26 engaged with the internal threads 24. Accordingly, as the strap 28 is pulled upwardly by the upper tether 32, the strap 28 rotates the second member 26 (i.e., clockwise in the example shown in the Figures), which translationally drives the second end 70 of the second member 26 into the cavity 22 as the external threads 26 of the second end 70 rotate relative internal threads 24 of the cavity 22. This translational movement compresses the energy absorber 30 in the cavity 22.

The first member 18 and the second member 26 may be, for example, metal, plastic, or any suitable material to transmit translational movement of the strap 28 into rotational movement of the second member 26 into linear translation of the second member 26 relative to the first member 18.

As set forth above, in some examples including the example shown in the Figures, the upper anchor 16 includes the frame 62 fixed to the seatback 14. Specifically, the frame 62 is fixed to the frame of the seatback 14, e.g., with fasteners, welding, etc. The frame 62 is immoveable relative to the seatback 14. The first member 18 is fixed to the frame 62 and the second member 26 is rotatably supported by the frame 62. As an example, the frame 62 may include a first hole 72 that receives the first member 18 and a second hole 74 that receives the second member 26. In such an example, the first member 18 is fixed in the first hole 72, i.e., is immoveable relative to the first hole 72. As an example, the first member 18 may be welded (e.g., directly welded and/or via a weld nut), adhered, fastened, etc., to the frame 62 at the first hole 72. The first member 18 may have a shoulder or opposing shoulders that abut the frame 62 at the first hole 72. The second member 26 is mounted to the second hole 74 such that the second member 26 may rotate relative to the second hole 74. For example, the second member 26 and/or the frame 62 at the second hole 74 may include a track, bearing, etc., that allows the second member 26 to rotate relative to the frame 62 at the second hole 74. As another example, the second member 26 and the second hole 74 may be sized such that the first end 68 of the second member 26 abuts the frame 62 in the second hole 74 and is free to rotate in the second hole 74.

The upper anchor 16 is designed to connect to the upper tether 32 such that upward movement of the upper tether 32 resulting from forward movement of the child seat 34 rotates the second member 26. In the example shown in the Figures, the upper anchor 16 includes the strap 28 on the second member 26. In such an example, the strap 28 is wound around the second member 26. Accordingly, when the upper tether 32 moves upwardly when the child seat 34 moves forward relative to the seatback 14, the upper tether 32 unwinds the strap 28 from the second member 26 as the second member 26 rotates relative to the first member 18 from the unloaded position to the loaded position. In other words, during such movement the strap 28 is paid out from the second member 26. In examples in which the upper anchor 16 is resettable, the rotation of the second member 26 relative to the first member 18 winds the strap 28 onto the second member 26 as the second member 26 rotates from the loaded position to the unloaded position.

Figure 5:
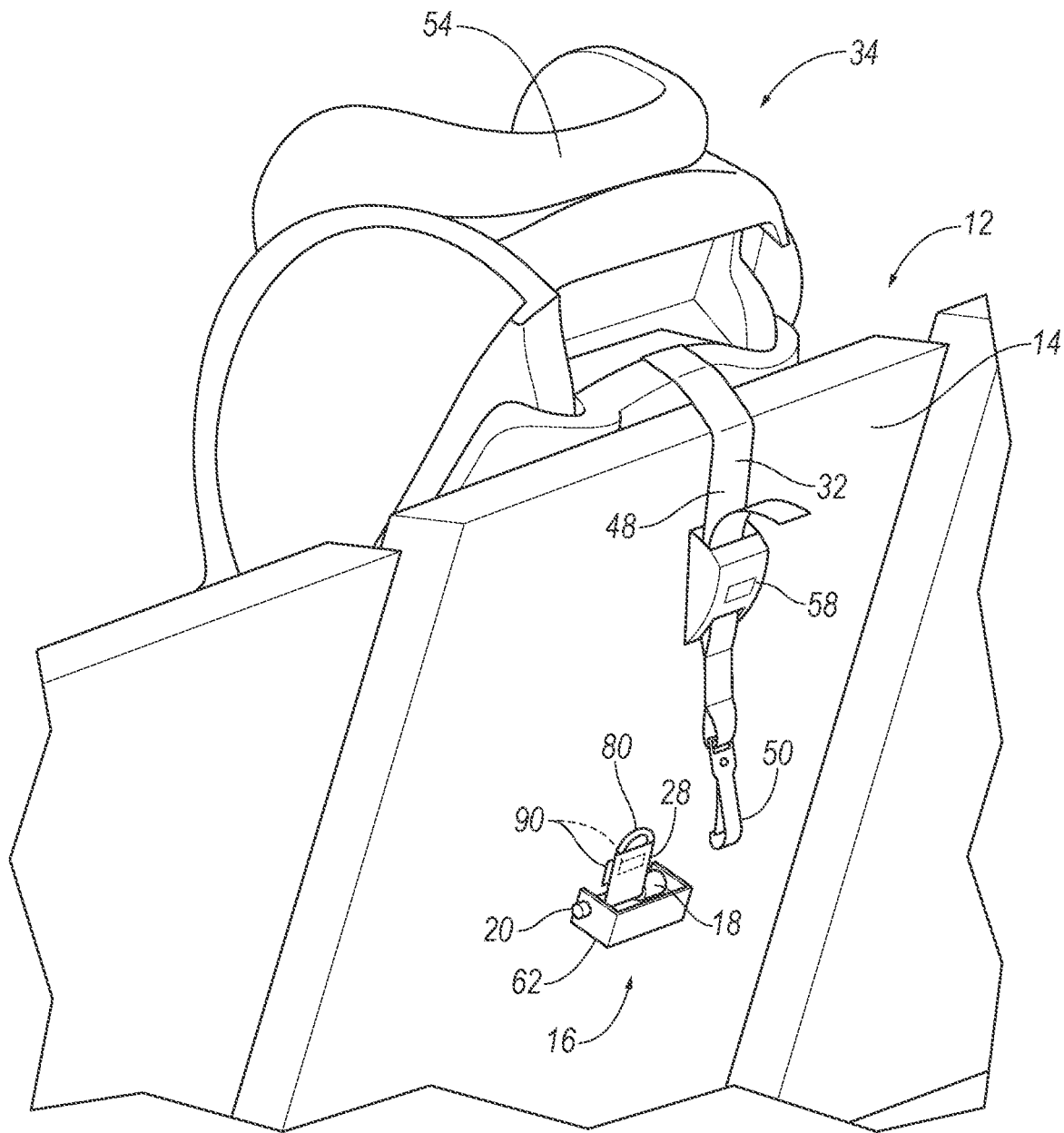
FIG. 5 is a perspective view of the child seat on the vehicle seat with a tether of the child seat disengaged with a tether anchor on the vehicle seat.
Figure 6:
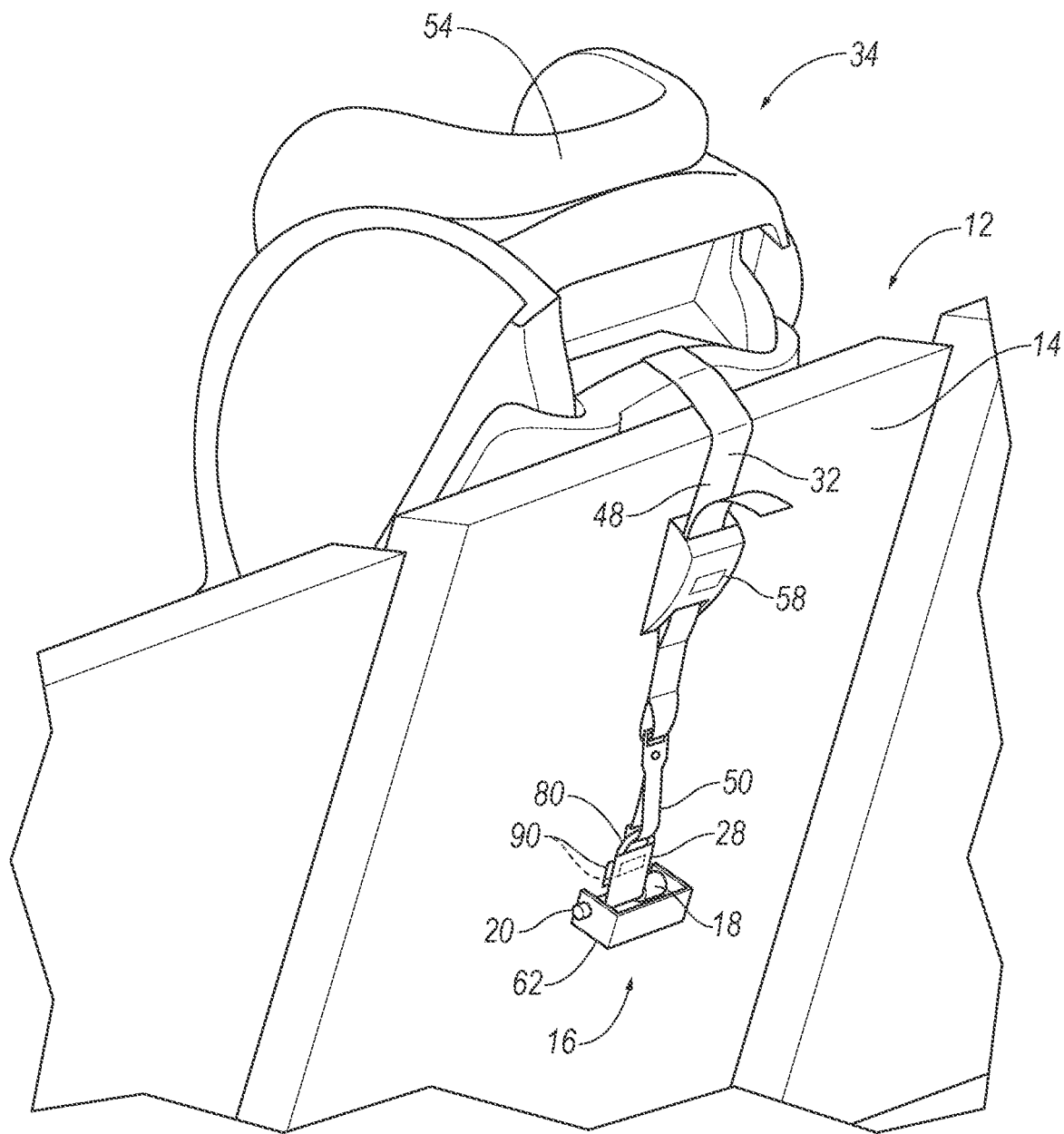
FIG. 6 is the view of FIG. 5 with the tether of the child seat engaged with the tether anchor on the vehicle seat.
Figure 7:
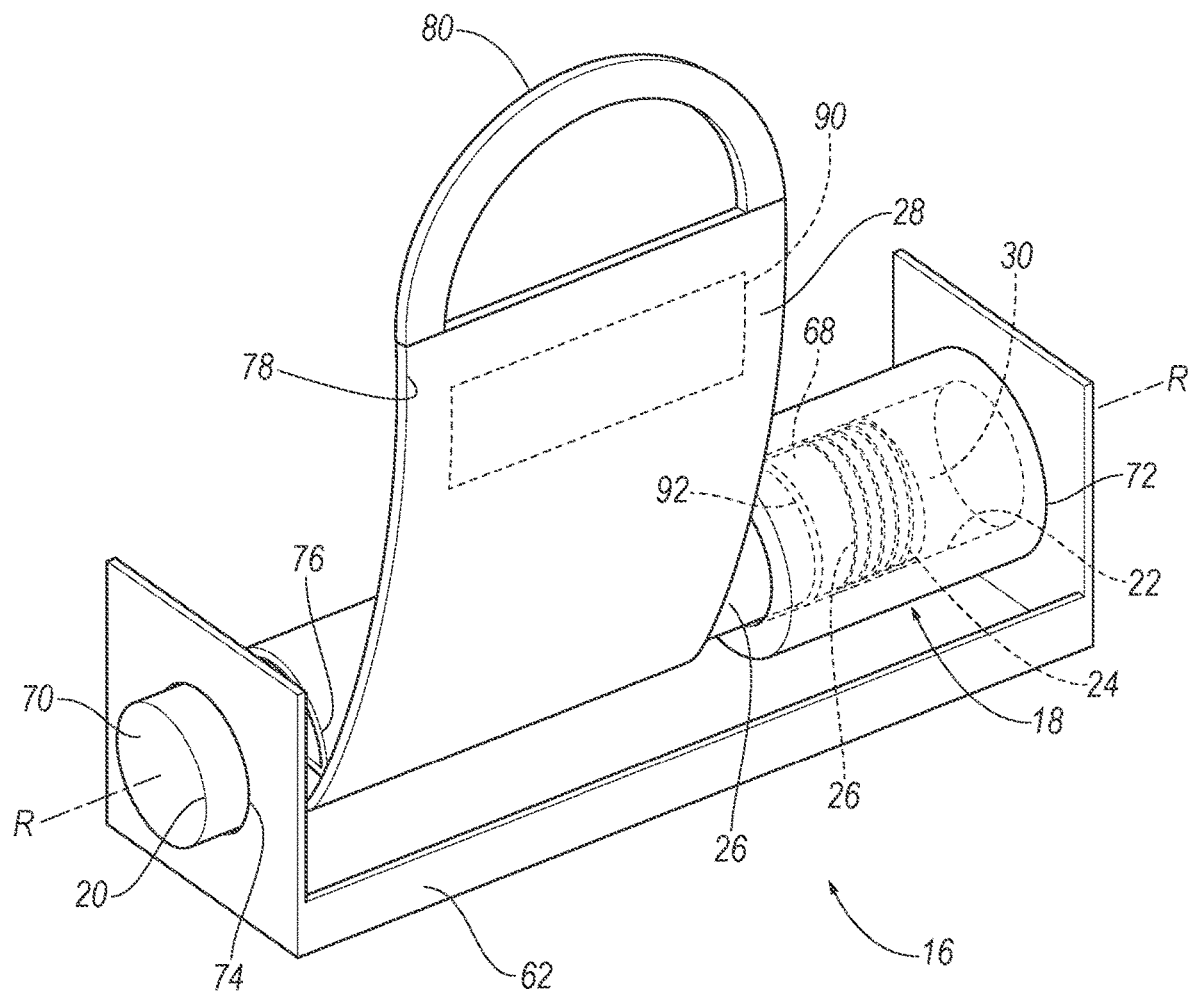
FIG. 7 is a perspective view of the tether anchor.

Specifically, the strap 28 includes a proximal end 76 fixed to the second member 26. In other words, the proximal end 76 moves with the second member 26 as the second member 26 rotates about the rotational axis. The strap 28 includes a distal end 78 spaced from the proximal end 76. The upper tether 32 is connectable to the distal end 78, e.g., by engagement of the clip 50 with a connecting ring 80 as described further below, and the distal end 78 of the strap 28 moves with the upper tether 32 as the t upper ether moves relative to the seatback 14, e.g., upward movement of the upper tether 32 when the child seat 34 moves forward relative to the seatback 14. The proximal end 76 may be fixed to the second member 26 in any suitable fashion, e.g., engagement with slot 88 in the second member 20. The strap 28 and the seatback 14 may include releasable retention structure 90 therebetween for holding the strap 28 upright against the force of gravity when the strap 28 is not engaged with the upper tether 32 (i.e. in the position shown in FIG. 5). As an example, the strap 28 and the seatback 14 may include corresponding hook-and-loop fasteners therebetween, as shown in the example in the Figures. The releasable retention structure 90, e.g., the hook-and-loop fasteners, positions the strap 28 for engagement with the upper tether 32, e.g., engagement of the clip 50 with the ring 80, and is releasable to allow the strap 28 to extend from and retract onto the first member 20 during movement of the child seat 34 relative to the seatback 14, as described further below.

The strap 28 may be flat, i.e., having a width much larger than a thickness. In other examples, the strap 28 may be cord-shaped, e.g., with a generally round cross section. The strap 28 may be fabric, as an example, and in such examples may be flat. The fabric may be woven nylon. As another example, the strap 28 may be metal (e.g., braided metal), filament (e.g., monofilament or braided filament), and in such examples may be cord-shaped.

The upper anchor 16 may include a connecting ring 80 fixed to the strap 28. Specifically, the connecting ring 80 may be fixed to the distal end 78 of the strap 28. The distal end 78 of the strap 28 may be sewn to the connecting ring 80. For example, the distal end 78 of the strap 28 may extend through the ring, be folded over itself, and sewn to itself. The connecting ring 80 is designed to be releasably engaged with the clip 50 of the tether. The ring may be, for example, metal. The connecting ring 80 is designed to transmit load between the strap 28 and the upper tether 32 during rotation of the second member 26 between the loaded and unloaded positions.

The upper anchor 16 includes energy absorber 30 in the cavity 22. The energy absorber 30 is retained in the cavity 22 as the second member 26 rotates relative to the first member 18. The energy absorber 30 is compressible relative to the first member 18 and the second member 26. Accordingly, as the second member 26 rotates from the unloaded position to the loaded position, the second member 26 compresses the energy absorber 30 between the first member 18 and the second member 26 and the energy absorber 30 absorbs energy from the second member 26 to resist payout of the strap 28 from the second member 26. The energy absorber 30 may resiliently deform between the loaded and unloaded positions, as described further below. In other words, in such examples, the energy absorber 30 deforms from the unloaded position to the loaded position and returns to the pre-loaded size, shape, and position as the second member 26 rotates from the loaded position to the unloaded position.

In some examples, including the example shown in the Figures, the upper anchor 16 is resettable when the load is removed from the strap 28 such that the upper anchor 16 automatically returns to the unloaded position, i.e., the second member 26 rotates relative to the first member 18 from the loaded position to the unloaded position. In such examples, the energy absorber 30 may be elastic, i.e., has an initial shape and size in the unloaded position, is deformed between the first member 18 and the second member 26 as the second member 26 moves to the loaded position, and returns to the initial shape and size when the second member 26 returns to the unloaded position. Specifically, in such an example, when the load is removed from the strap 28, the energy absorber 30 unloads to move the second member 26 from the loaded position to the unloaded position. The energy absorber 30, the internal threads 24, the external threads 26, etc., may be designed such that the energy absorber 30 returns the second member 26 to the unloaded position. In the unloaded position, the energy absorber 30 is loaded less than when in the loaded position. It should be appreciated that the energy absorber 30 may be loaded in the unloaded position, albeit loaded less than in the loaded position, i.e., the energy absorber 30 may be pre-loaded when the second member 26 is in the unloaded position and further loaded as the second member 26 moves to the loaded position.

The energy absorber 30 may be an energy-absorbing material. In such examples, the material properties of the energy absorber 30 result in the absorption of energy as the second member 26 moves to the loaded position. As an example, the energy absorber 30 may include a compressible fluid, as described below. As another example, the energy absorber 30 may be elastic foam, e.g., elastomeric foam such as elastomeric polyurethane. In other examples, the energy absorber 30 may be a spring, e.g., a coil spring between the first member 18 and the second member 26, a torsion spring with ends fixed to the first member 18 and the second member 26, etc.

Figure 8:
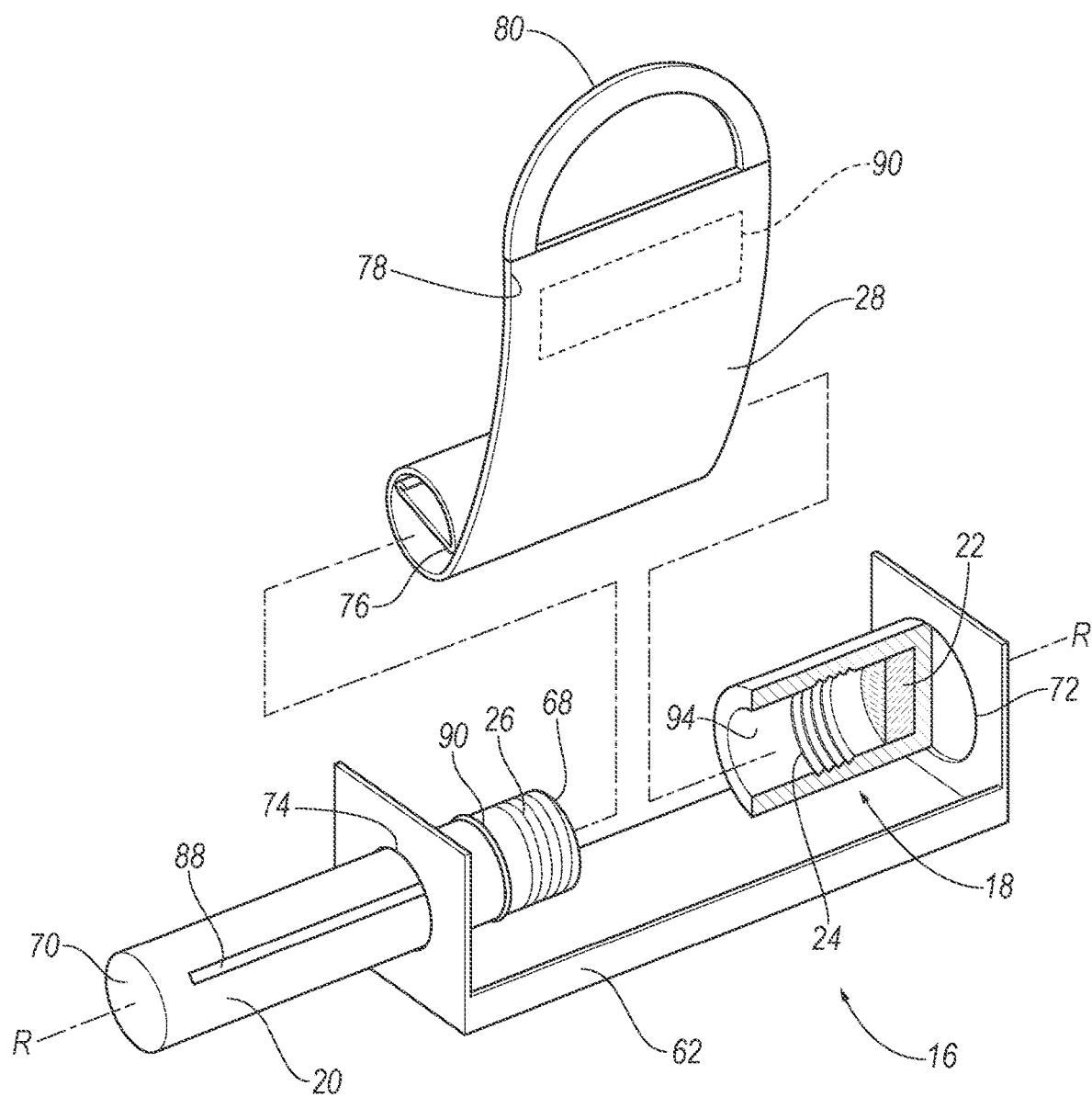
FIG. 8 is an exploded view of the tether anchor with a portion shown in cross-section to illustrate the location of a compressible fluid in a cavity of the tether anchor when assembled in FIG. 7.

The energy absorber 30 may be a compressible fluid 82 sealed in the cavity 22 between the first member 18 and the second member 26. Specifically, the energy absorber 30 may be a compressible fluid 82 sealed in the cavity 22 between the first member 18 and the second member 26. In such examples, the upper anchor 16 seals the compressible fluid 82 in the cavity 22. As an example, a seal 92 may be between the first member 18 and the second member 26. The seal 92, for example, may be an elastomeric O-ring. In the example shown in the Figures, the seal 92 is on the second member 20, e.g., in a groove on the second member 20, and the seal 92 seals to a smooth portion 94 (FIG. 8) along the cavity 22. In such an example, the seal 92 rotates about axis R and/or slides along axis R relative to at least one of the first member 18 and the second member 20 and maintains a seal therebetween the retain the energy absorber 30, e.g., the compressible fluid 82, in the cavity 22.

As an example of a compressible fluid 82, the energy absorber 30 may include a liquid 84 and hydrophobic nanoporous particles 86 in the liquid 84. In such an example, the energy absorber 30 is elastically compressible between the first member 18 and the second member 26, as described above. The energy absorber 30 may be made of different substances that remain separate, e.g., a colloid or a suspension. For example, the energy absorber 30 may be a colloid of the hydrophobic nanoporous particles 86 in the liquid 84. The liquid 84 may be any inert, i.e., nonreactive, liquid, e.g., water, lithium chloride, etc.

The particles 86 are nanoporous, i.e., the particles have nanopores. The nanopores may have diameters on the order of 1 nm to 100 nm. The particles 86 may be, for example, silicon. The particles 86 are hydrophobic, that is, tending to repel water or fail to mix with water. The particles 86 may be formed of a material that is hydrophobic, or the particles 86 may have hydrophobic surface treatment, e.g., chlorotrimethylsilane or chlorodimethyloctylsilane in toluene.

Figure 9A:
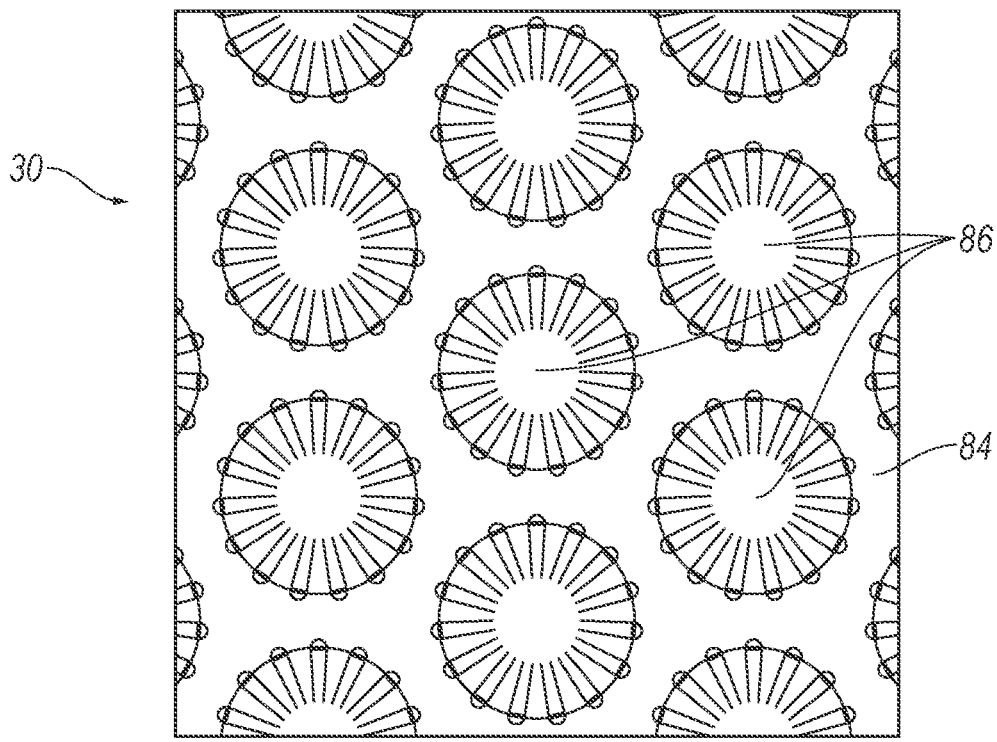
FIG. 9A is a diagram of the compressible fluid including a liquid and hydrophobic nanoporous particles in the liquid in the uncompressed state.
Figure 9B:
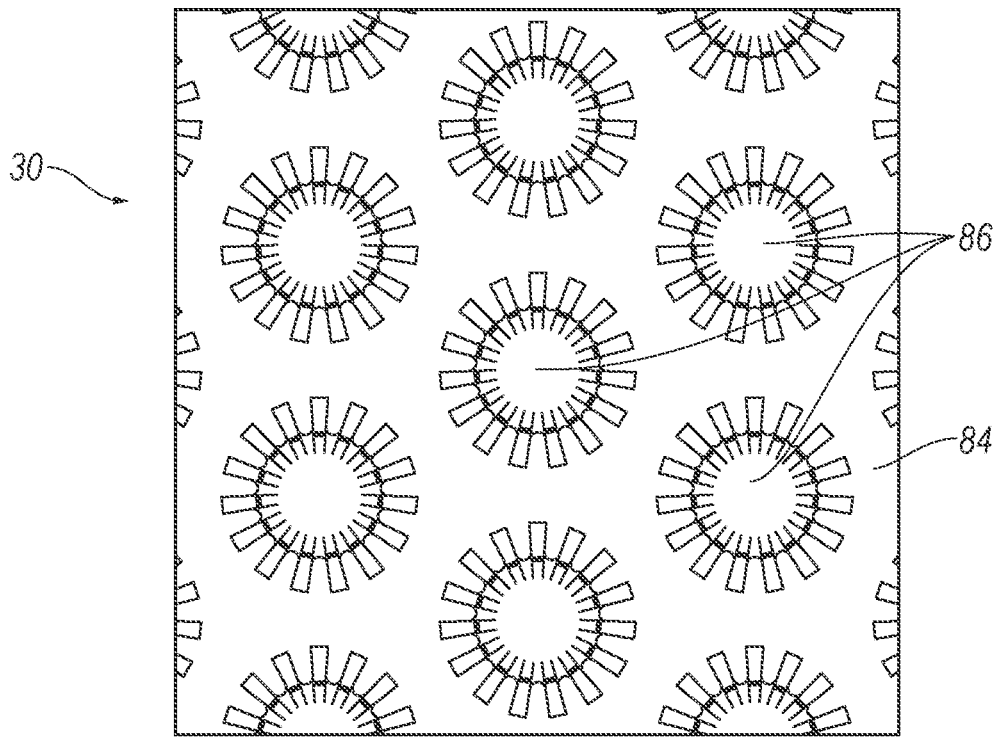
FIG. 9B is a diagram of the compressible fluid of FIG. 9A in the compressed state.

In the unloaded position, air fills the nanopores of the particles 86, and surface tension prevents the liquid 84 from entering the nanopores, as shown in FIG. 9A. As the second member 26 moves from the unloaded position to the loaded position, a pressure is be applied to the energy absorber 30 by the first member 18 and the second member 26. In the loaded position, the pressure becomes sufficient to overcome surface tension, and the liquid 84 enters the nanopores and compresses the air inside the nanopores, as shown in FIG. 9B. The energy absorber 30 may absorb energy from the child seat 34 when the liquid 84 enters the nanopores, i.e., when the energy absorber 30 is compressed to the compressed state. Once the nanopores are mostly full of the liquid, in the compressed state, the pressure increases substantially. The volume of the energy absorber 30 may be reduced by as much as 80%. The pressure is affected by the choice of material for the particles, the average size of the particles, the number of nanopores per particle, the average size of the nanopores, the surface treatment, and the choice of liquid.

The second member 26 is moveable from the unloaded position in which the nanopores are substantially filled with air to the second position in which the nanopores are substantially filled with the liquid 84. The volume of the energy absorber 30 when the second member 26 is in the loaded position may be at most half of the volume, i.e., half or less than half of the volume, e.g., as little as 20% of the volume, of the energy absorber 30 when the second member 26 is in the unloaded position.

The compression of the energy absorber 30 may be partially or fully reversible. In the example shown in the Figures, the energy absorber 30, i.e., the compressible fluid 82 resiliently deforms between the loaded and unloaded positions. In other words, in such examples, the compressible fluid 82 deforms from the unloaded position to the loaded position and returns to the pre-loaded size, shape, and position as the second member 26 rotates from the loaded position to the unloaded position. After the load on the child seat 34 subsides, the energy absorber 30 expands from the loaded position to the unloaded position, i.e., the energy absorber 30 moves the second member 26 to the unloaded position. In this situation, as the pressure decreases, the air compressed in the nanopores expands, and the volume occupied by the energy absorber 30 expands. In other words, the liquid 84 evacuates, i.e., exits, the nanopores.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat comprising:
   a seatback;
   a child seat tether anchor supported by the seatback;
   the child seat tether anchor having a first member fixed to the seatback and a second member rotatably supported by the seatback, one of the first member and the second member defining a cavity with internal threads and the other of the first and second member being received in the cavity and having external threads engaged with the internal threads;
   a strap on the second member; and
   an energy absorber in the cavity, the energy absorber being compressible relative to the first member and the second member;
   the child seat tether anchor includes a frame fixed to the seatback, the first member being fixed to the frame at all times and the second member being rotatably supported by the frame.

2. The vehicle seat as set forth in claim 1, wherein the strap is wound around the second member.

3. The vehicle seat as set forth in claim 2, further comprising a connecting ring fixed to the strap, the strap including a proximal end fixed to the second member and a distal end spaced from the proximal end, the connecting ring being fixed to the distal end.

4. The vehicle seat as set forth in claim 1, further comprising a connecting ring fixed to the strap, the strap including a proximal end fixed to the second member and a distal end spaced from the proximal end, the connecting ring being fixed to the distal end.

5. The vehicle seat as set forth in claim 1, wherein the frame includes a hole that rotatably receives the second member.

6. The vehicle seat as set forth in claim 1, wherein the second member has a first end and a second end spaced from each other along a rotational axis, the threads being on the first end and the second end engaging the hole.

7. The vehicle seat as set forth in claim 1, wherein the energy absorber is a compressible fluid sealed in the cavity between the first member and the second member.

8. The vehicle seat as set forth in claim 1, wherein the energy absorber is a compressible liquid sealed in the cavity between the first member and the second member.

9. The vehicle seat as set forth in claim 1, wherein the energy absorber includes a liquid and hydrophobic nanoporous particles in the liquid.

10. An assembly comprising:
    a seat having a seatback;
    a child seat anchored to the seat and having a tether;
    an anchor supported by the seatback;
    the anchor having a first member fixed to the seatback at all times and a second member rotatably supported by the seatback, one of the first member and the second member defining a cavity with internal threads and the other of the first and second member being received in the cavity and having external threads engaged with the internal threads;
    a strap on the second member, the tether of the child seat connected to the strap; and
    an energy absorber in the cavity, the energy absorber being compressible relative to the first member and the second member.

11. The assembly as set forth in claim 10, wherein the strap is wound around the second member.

12. The assembly as set forth in claim 11, further comprising a ring fixed to the strap, the strap including a proximal end fixed to the second member and a distal end spaced from the proximal end, the ring being fixed to the distal end, and the tether being connected to the ring.

13. The assembly as set forth in claim 10, further comprising a ring fixed to the strap, the strap including a proximal end fixed to the second member and a distal end spaced from the proximal end, the ring being fixed to the distal end, and the tether being connected to the ring.

14. The assembly as set forth in claim 10, wherein the energy absorber is a compressible fluid sealed in the cavity between the first member and the second member.

15. The assembly as set forth in claim 10, wherein the energy absorber is a compressible liquid sealed in the cavity between the first member and the second member.

16. The assembly as set forth in claim 10, wherein the energy absorber includes a liquid and hydrophobic nanoporous particles in the liquid.

17. The assembly as set forth in claim 10, wherein the second member is rotatable relative to the first member between a loaded position that loads the energy absorber and an unloaded position that unloads the energy absorber relative to the loaded position, the energy absorber resiliently deforming between the loaded and unloaded positions.

* * * * *